H. ALLEN.
RAILROAD RAIL-JOINT.
No. 7,100.
Reissued May 9, 1876.
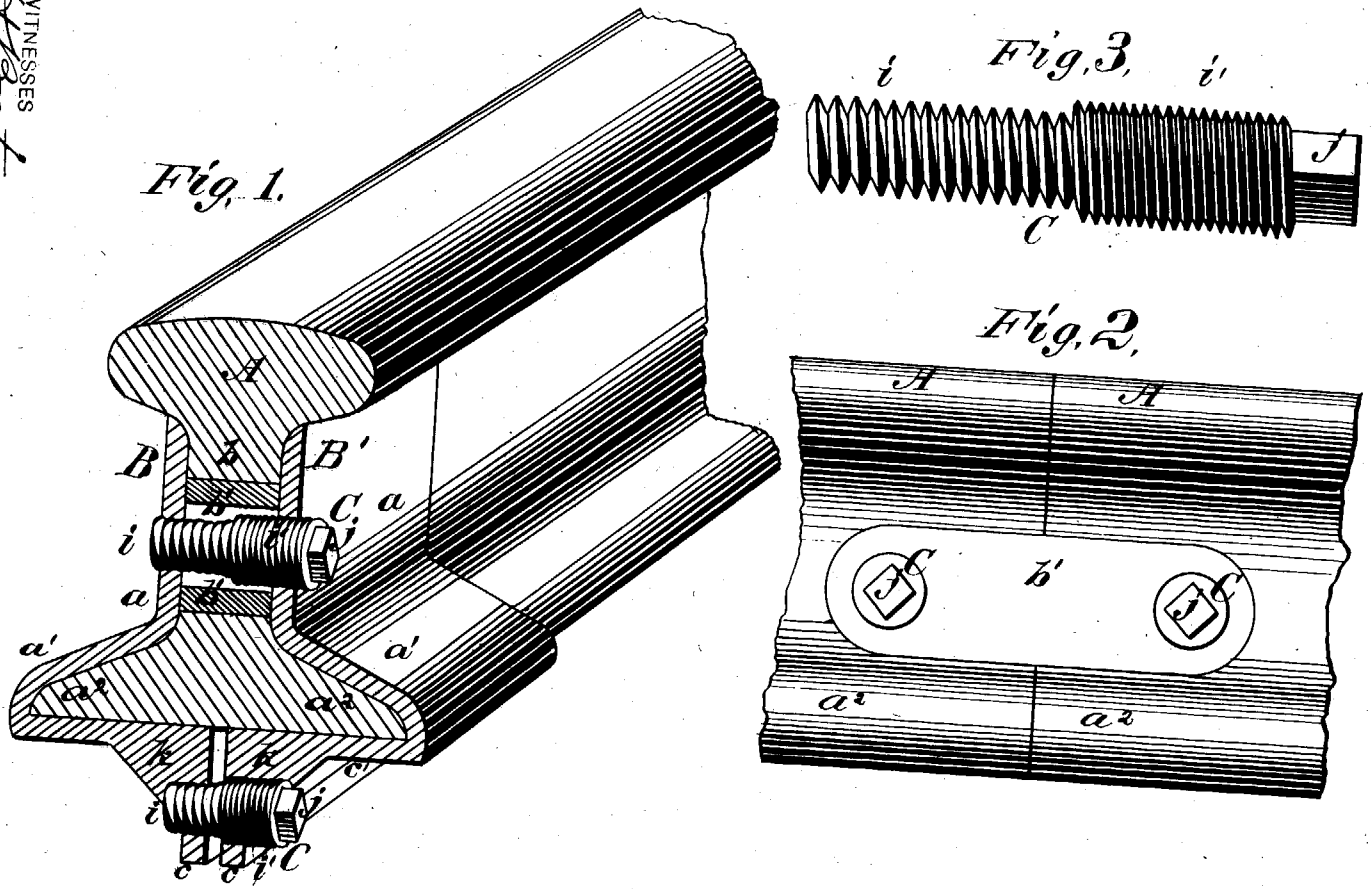
WITNESSES
E. H. Bates
George H. Larner
INVENTOR
Hosea Allen.
Gilmore & Co.
ATTORNEYS

UNITED STATES PATENT OFFICE.

HOSEA ALLEN, OF TITUSVILLE, PENNSYLVANIA.

IMPROVEMENT IN RAILROAD-RAIL JOINTS.

Specification forming part of Letters Patent No. 168,704, dated October 11, 1875; reissue No. 7,100, dated May 9, 1876; application filed December 24, 1875.

*To all whom it may concern:*

Be it known that I, HOSEA ALLEN, of Titusville, in the county of Crawford and State of Pennsylvania, have invented a new and valuable Improvement in Railroad-Joints; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a transverse vertical section of a railroad-rail having my improvement attached. Fig. 2 is a side view of the joining ends of two rails, showing the intermediate block which I sometimes use. Fig. 3 is a view of the differential screw-bolt.

This invention has relation to improvements in railroad-joints; and it consists in a bolt made with screw-threads of different pitch, and in two parts of different diameters, the coarser thread being on that portion of the bolt having the lesser diameter, and the finer thread on that portion having the greater diameter, whereby a means is provided for clamping the plates against the web of the rails without the use of nuts, all as will be hereinafter more fully explained. It also consists, in combination with such a bolt or bolts, of railroad-rail fish-plates, and in the construction and novel arrangement of the bolts with an intermediate block fitting in a slot in the rail, and provided with perforations of the same diameter as the larger screw-threaded part of the bolt, as hereinafter shown and described.

In the annexed drawings, the letter A designates an ordinary T-rail, in connection with which I propose to illustrate my invention. Two metallic plates, operating after the manner of fish-bars, are designed to be arranged at the joint of two rails, one on each side thereof. Plates B B′ are such as I prefer to use. Each of these plates is provided with a portion, *a*, fitting snugly to the neck *b* of the rail of a part, *a′*, embracing the web of a rail, and of a flange, *c*, at right angles to the under side of the supporting-flange *c′* of the rail, as shown in Fig. 1. When these plates are arranged one on each side of the joint of the rails, they will present the appearance shown in Fig. 1.

Heretofore it has been usually customary to clamp plates B B′ together about the rails by means of suitable bolts and nuts, the use of which has been attended with this objection, that the nuts, owing to the vibration of the rails, caused by passing trains, frequently rotated on the bolts and allowed the plates to separate from each other, and thus release the rails; and to the objeetion that the nuts, when locks were used, broke off bodily under the changes of temperature to be expected in a moderate climate, as from warm to cold, and the reverse. This objection I propose to remedy in the following manner, to wit: The supporting-flanges *c′* of plates B B′ are each provided with a number of screw-threaded perforations, those in one plate being adapted to register with those in the other, as are also the perforations in the portions *a* thereof, which fit to the web of the rail and the web itself. Through these perforations screw-bolts C are passed, and being properly set up have the effect to clamp the plates B B′ against the rail without using either the detached clamp-nut or the headed bolt, for the following reasons: Bolts C are made in two parts, *i i′*, of different diameters, the part *i* of the lesser diameter being provided with a coarser thread than the part *i′* of the greater diameter. Plates B B′ being provided, the one B with screw-threaded perforations adapted to receive the part *i* of the bolt, and the other with similar perforations adapted to receive the part *i′* of the bolt, the plates B B′, when put into position on the rail, and when the bolts are set up by means of a key applied to their prismatic heads *j*, will be rigidly clamped around the web of the rail, the plate B being endowed with the functions of a clamp, in consequence of the coarse thread of the part *i* of the bolt.

It will be seen and readily understood that when the bolts C are set up the plate B will be more rapidly clamped against the web of the rail than plate B′, though their movements inward toward each other will be simultaneous, the effect of which is to obtain a very fine adjustment, and to take up very rapidly any slack which may have occurred.

In order to strengthen these flanges *c*, and prevent them from flexing when under strain, they are provided with a re-enforce, *k*, at their angle of junction with the body of the plate, which re-enforcement I purpose to make the subject-matter of a separate application.

The letter *b'* represents a joint block, fitted into recesses in the ends of the rail, and is provided with perforations of the same diameter as the bolt C.

The difference in the diameters of the screw-thread is very important, for the following reasons: By my construction the screw-threaded portion of the bolt of the smaller diameter can readily be inserted and passed through the larger screw-threaded perforation in one of the fish-plates, and thence through the perforation in the block fitted in the ends of the rails and screwed into the perforation in the opposite fish-plate, thus bringing and locking the plates together against the rail without the use of nuts, heads, or washers.

It is obvious that my peculiar bolt is adapted for use with any form of clamping-plates suitably arranged on the sides of the rails, provided that the threaded openings in such plates be of such diameters, respectively, as to receive the parts *i* and *i'* of said bolt.

What I claim is—

1. As a new article of manufacture, the lock-bolt C, screw-threaded from its head to its point, the diameter of the threaded portion *i'* greater than the diameter of the threaded portion *i*, and the screw-threads of the latter being coarser than the screw-threads on the former, substantially as specified.

2. The bolt C, constructed as set forth, in combination with the block *b'*, fitting in a slot of the rail, and provided with perforations of the same diameter as the screw-threaded part *i'* of the bolt, substantially as described, and for the purpose set forth.

3. The combination of the lock-bolt C with clamping or fish plates for rail-joints, such plates being provided with threaded openings corresponding in diameter with and adapted to receive, respectively, the parts *i i'* of said bolt, substantially as specified.

4. The combination of the bolt C with the plates B B', formed substantially as and for the purpose specified.

In testimony that I claim the above I have hereunto subscribed my name in the presence of two witnesses.

HOSEA ALLEN.

Witnesses:
GEORGE E. UPHAM,
WALTER C. MASI.